US009077250B2

(12) United States Patent
Huang et al.

(10) Patent No.: US 9,077,250 B2
(45) Date of Patent: Jul. 7, 2015

(54) CONSTANT CURRENT CONTROL UNITS AND CONTROL METHODS THEREOF FOR PRIMARY SIDE CONTROL

(71) Applicant: Leadtrend Technology Corporation, Hsinchu (TW)

(72) Inventors: Yu-Yun Huang, New Taipei (TW); Yi-Lun Shen, Taipei (TW)

(73) Assignee: LEADTREND TECHNOLOGY CORPORATION, Hsinchu (TW)

( * ) Notice: Subject to any disclaimer, the term of this patent is extended or adjusted under 35 U.S.C. 154(b) by 23 days.

(21) Appl. No.: 13/833,699

(22) Filed: Mar. 15, 2013

(65) Prior Publication Data

US 2014/0009977 A1    Jan. 9, 2014

(30) Foreign Application Priority Data

Jul. 4, 2012    (TW) .............................. 101123952 A

(51) Int. Cl.
*H02M 3/335*    (2006.01)
(52) U.S. Cl.
CPC ................................ *H02M 3/33507* (2013.01)
(58) Field of Classification Search
None
See application file for complete search history.

(56) References Cited

U.S. PATENT DOCUMENTS

| 6,977,824 | B1* | 12/2005 | Yang et al. | ................. | 363/21.16 |
| 7,492,613 | B2* | 2/2009 | Yang et al. | ................. | 363/21.01 |
| 8,300,431 | B2* | 10/2012 | Ng et al. | .................... | 363/21.12 |
| 8,391,028 | B2 | 3/2013 | Yeh | | |
| 8,879,282 | B2 | 11/2014 | Yeh | | |
| 2005/0219870 | A1* | 10/2005 | Yang et al. | ................. | 363/21.01 |
| 2008/0123372 | A1* | 5/2008 | Yang | .......................... | 363/21.16 |
| 2008/0136393 | A1* | 6/2008 | Yang et al. | .................... | 323/284 |
| 2012/0327691 | A1* | 12/2012 | Strijker | ...................... | 363/21.01 |
| 2013/0063112 | A1* | 3/2013 | Yang et al. | .................... | 323/282 |

FOREIGN PATENT DOCUMENTS

TW    201101666    11/2011

* cited by examiner

*Primary Examiner* — Timothy J Dole
*Assistant Examiner* — Monica Mata
(74) *Attorney, Agent, or Firm* — McClure, Qualey & Rodack, LLP

(57) ABSTRACT

Herein is disclosed a constant current control unit and a control method, for a switched mode power supply with primary side control. The switched mode power supply comprises a power switch and an inductive device. A reflective voltage of the inductive device is detected to generate a feedback voltage signal. By delaying the feedback voltage signal, a delayed signal is generated. According to the feedback voltage and the delayed signal, a discharge time of the inductive device is determined when the power switch is OFF. According to the discharge time and a current-sense signal, a maximum average output current of the switched mode power supply is stabilized. The current-sense signal represents a current flowing through the inductive device.

17 Claims, 4 Drawing Sheets

CONSTANT CURRENT CONTROL UNITS AND CONTROL METHODS THEREOF FOR PRIMARY SIDE CONTROL

CROSS-REFERENCE TO RELATED APPLICATION

This application claims priority to and the benefit of Taiwan Application Series Number 101123952 filed on Jul. 4, 2012, which is incorporated by reference in its entirety.

BACKGROUND

The present disclosure relates generally to switched mode power supplies with primary side control.

Power supplies, as needed for most electronic apparatuses, convert the electric power from power sources, such as batteries or power grids, into the electric power with specifications required by loadings. Among conventional power supplies, switched mode power supply, known to be compact in size and efficiency in power conversion, is globally popular, especially in consumer market.

Two different control methodologies are employed for switched mode power supplies. One is primary side control (PSC), and the other secondary side control (SSC). SSC utilizes a detection circuit directly sensing an output node powered by the secondary winding of a power supply, and the detection result is passed, via a photo coupler, to a power controller located in the primary side to regulate the power a primary winding converts. Different to SSC, PSC directly senses a reflective voltage across an auxiliary winding to indirectly know the output voltage over the secondary winding and the output voltage on the output node. For PSC, detection of output voltage and control of power conversion are both performed in the primary side. In comparison with SSC, PSC is cheaper in view of bill of material (BOM) cost, because it needs no bulky and costly photo coupler. Furthermore, PSC could naturally have higher conversion efficiency as it has no detection circuit located in the secondary side, which acts as an additional loading constantly consuming power.

FIG. 1 is a switched mode power supply 10 known in the art, employing the control methodology of PSC. Bridge rectifier 20 performs full-wave rectification, converting the alternative-current (AC) power source from a power grid into a direct-current (DC) input power source $V_{IN}$. The voltage of the input power source $V_{IN}$ could have an M-shaped waveform or be substantially a constant. Via the driving node GATE, the power controller 26 periodically turns ON and OFF the power switch 34. When the power switch 34 is ON, the primary winding PRM of the transformer energizes. When it is OFF, the transformer de-energizes via the secondary winding SEC and the auxiliary winding AUX to build up output power source $V_{OUT}$ for loading 24 and operation power source $V_{CC}$ for power controller 26.

The voltage divider consisting of resisters 28 and 30 detects voltage drop $V_{AUX}$ over the auxiliary winding AUX, to provide the feedback node FB of the power controller 26 feedback voltage signal $V_{FB}$. When the power switch 34 is OFF, the voltage drop $V_{AUX}$ is a reflective voltage in proportion to the voltage drop over the secondary winding SEC. Based on the feedback voltage signal $V_{FB}$, power controller 26 builds compensation voltage $V_{COM}$ upon the compensation capacitor 32, to control the duty cycle of the power switch 34 accordingly. Via current-sense node CS, power controller 26 detects current-sense voltage $V_{CS}$, which represents the current $I_{PRM}$ flowing through not only the current sense resistor 36, but also the power switch 34 and the primary winding PRM.

FIG. 2 shows gate voltage $V_{GATE}$, feedback voltage signal $V_{FB}$, and secondary output current $I_{SEC}$ of FIG. 1, where the secondary output current $I_{SEC}$ is the current flowing through the secondary winding SEC and powering the loading 24. By knowing the peak value of secondary output current $I_{SEC}$ and the real discharge time $T_{DIS-R}$ when secondary winding SEC discharges, power controller 26 could conclude both the total amount of output charge from the secondary winding SEC and the average output current, to determine whether the average output current is out of specification.

As known in the art, an estimated discharge time $T_{DIS-E}$, used as the real discharge time $T_{DIS-R}$, is determined by sensing the first time when feedback voltage signal $V_{FB}$ drops across about 0V after gate signal $V_{GATE}$ turns to 0V. Nevertheless, estimated discharge time $T_{DIS-E}$ is very different to real discharge time $T_{DIS-R}$, as shown in FIG. 2. After the completion of the discharge, it takes time for the feedback voltage signal $V_{FB}$ to reach 0V, causing the difference between the real discharge time $T_{DIS-R}$ and the estimated discharge time $T_{DIS-E}$. This difference could cause both misjudgment of the average output current from the secondary side and failure of average output current regulation for switched mode power supply 10.

SUMMARY

Embodiments of the present invention disclose a constant current control unit apt to a switched mode power supply with primary side control. The switched mode power supply has a power switch and an inductive device. A voltage-waveform detector in the constant current control unit determines a discharge time of the inductive device when the power switch is OFF, based on a feedback voltage signal and a delayed signal. The feedback voltage signal is provided from a reflective voltage of the inductive device and the delayed signal is generated by delaying the feedback voltage signal. A constant current controller in the constant current control unit generates an integral result according to the discharge time and a current-sense signal. The current-sense signal is provided based on a current flowing through the inductive device. The integral result is used for controlling the power switch to stabilize a maximum average output current of the switched mode power supply.

Embodiments of the present invention disclose a control method apt to a switched mode power supply with primary side control. The switched mode power supply comprises a power switch and an inductive device. A reflective voltage of the inductive device is detected to generate a feedback voltage signal. By delaying the feedback voltage signal, a delayed signal is generated. According to the feedback voltage and the delayed signal determining, a discharge time of the inductive device is determined when the power switch is OFF. According to the discharge time and a current-sense signal, a maximum average output current of the switched mode power supply is stabilized. The current-sense signal represents a current flowing through the inductive device.

BRIEF DESCRIPTION OF THE DRAWINGS

The invention can be more fully understood by the subsequent detailed description and examples with references made to the accompanying drawings, wherein.

DETAILED DESCRIPTION

Figure 3:
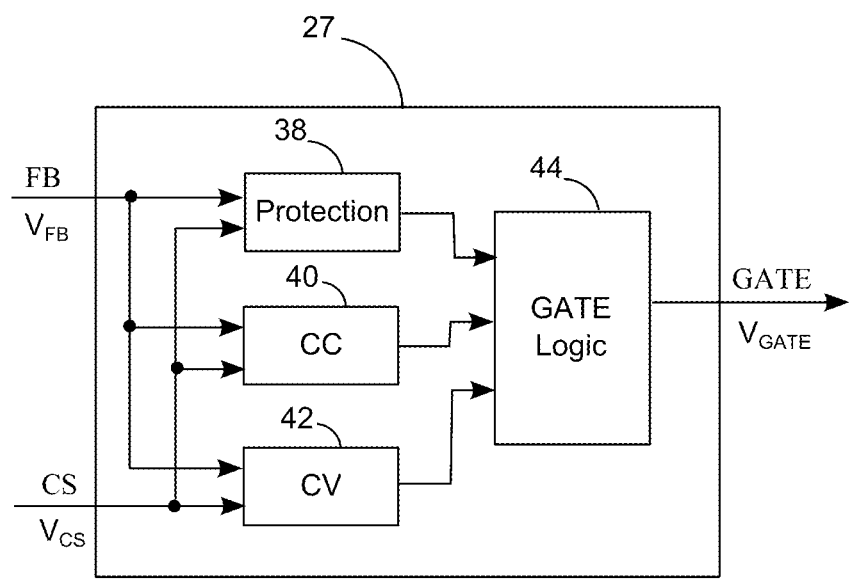
FIG. 3 demonstrates a power controller according to embodiments of the invention.

FIG. 3 demonstrates a power controller 27 according to embodiments of the invention. In one embodiment of the invention, power controller 27 replaces the power controller 26 in FIG. 1. The switched mode power supply 10 is not for limiting the scope of the invention, and the invention could be apt to other kinds of power supplies.

Power controller 27 has a protection unit 38, a constant current control unit 40, a constant voltage control unit 42, and a gate logic 44. The gate logic 44 gathers the output results from the protection unit 38, the constant current control unit 40, and the constant voltage control unit 42 to generate gate signal $V_{GATE}$ as a pulse-width-modulation signal for controlling the duty cycle of the power switch 34.

Even though they all are coupled to the feedback node FB and the current sense node CS, the protection unit 38, the constant current control unit 40, and the constant voltage control unit 42 function differently. The protection unit 38 is in charge of detection of the occurrence of abnormal events, such as over voltage, output short, over loading, to name a few, to provide appropriate protection mechanisms for the whole switched mode power supply. The purpose of the constant current control unit 40 is to limit the average output current powering the loading 24, making the average output current not over a predetermined maximum value. In other words, the constant current control unit 40 stabilizes the average output current to the loading 24 to be the maximum value when the loading 24 is very heavy. During the time when the loading 24 is normal or light, the constant voltage control unit 42 stabilizes the voltage value of the output power source $V_{OUT}$ to be a predetermined voltage.

Figure 4:
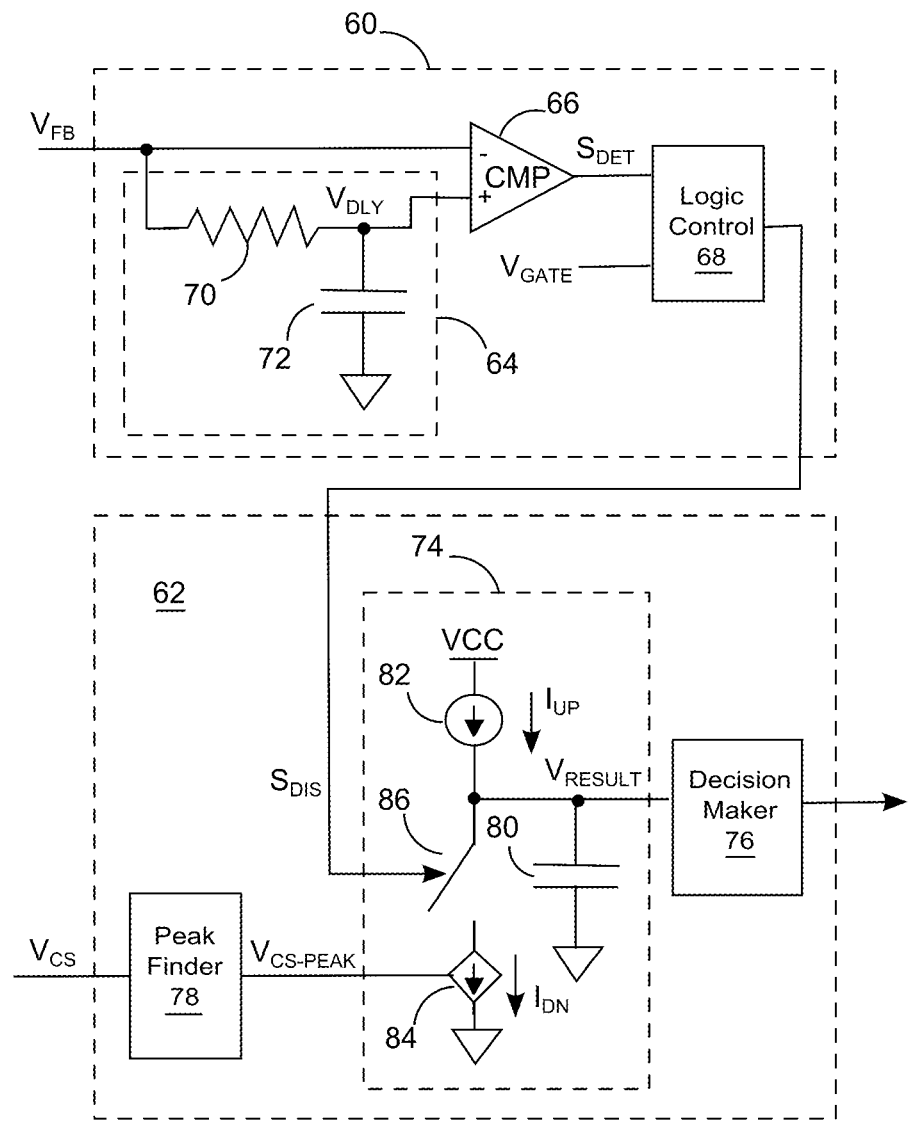
FIG. 4 demonstrates the constant current control unit in FIG. 4.

FIG. 4 demonstrates the constant current control unit 40 of FIG. 3, including a voltage-waveform detector 60 and a constant current controller 62. The voltage-waveform detector 60 outputs discharge signal $S_{DIS}$, which represents discharge time $T_{DIS-E-NEW}$, based on which the constant current controller 62 performs maximum output current control to limit the average output current to the loading 24 in the secondary side.

Inside the voltage-waveform detector 60 are a low-pass filter 64, a comparator 66 and a logic control 68. The low-pass filter 64, consisting of a resistor 70 and a capacitor 72, low passes the feedback voltage signal $V_{FB}$ to generate delayed signal $V_{DLY}$. Equivalently, the low-pass filter 64 delays the feedback voltage signal $V_{FB}$ for a RC time constant to provide delayed signal $V_{DLY}$, and this RC time constant is determined by the electric characteristics of the resistor 70 and the capacitor 72. The comparator 66 compares the feedback voltage signal $V_{FB}$ with delayed signal $V_{DLY}$. When the feedback voltage signal $V_{FB}$ decreases and becomes a certain amount less than the delayed signal $V_{DLY}$, the detection result $S_{DET}$ is asserted, meaning the feedback voltage signal $V_{FB}$ seems to drop abruptly, an indication that the discharge of the secondary winding SEC completes. Based on the gate signal $V_{GATE}$ and the detection result $S_{DET}$, the logic control 68 provides the discharge signal $S_{DIS}$ to estimate a discharge time $T_{DIS-E-NEW}$ of the secondary winding SEC when the power switch 34 is OFF.

The constant current controller 62 has an integrator 74, a peak finder 78, and a decision maker 76. The peak finder 78 generates peak voltage $V_{CS-PEAK}$, representing the peak voltage of the current-sense voltage $V_{CS}$ when the power switch 34 is ON. The integrator 74 has a constant current source 82, a switch 86, a voltage-controllable current source 84 and a capacitor 80. Controlled by discharge signal $S_{DIS}$, the switch 86 acts as a short circuit only during the discharge time $T_{DIS-E-NEW}$. The voltage-controllable current source 84 converts peak voltage $V_{CS-PEAK}$ to sink current $I_{DN}$, which drains or discharges capacitor 80 only during the discharge time $T_{DIS-E-NEW}$. The capacitor 80 stores accordingly the integral result of the sink current $I_{DN}$ with respect to the discharge time $T_{DIS-E-NEW}$. The constant current source 82 provides constant current $I_{UP}$ to charge the capacitor 80 constantly, which similarly stores the integral result of the constant current $I_{UP}$ with respect to the whole cycle time of the power switch 34. A cycle time is the summation of the ON time when the power switch 34 is ON and the OFF time when the power switch 34 is OFF. By checking the trend of the integral result voltage $V_{RESULT}$ as the count of the switch cycles increases over time, it can be determined whether the average output current from the secondary winding SEC has exceeded a predetermined maximum value represented by the constant current $I_{UP}$. If the integral result voltage $V_{RESULT}$ goes beyond a certain range, the decision maker 76 can provide feedback control to pull it back, such that the average output current from the secondary winding SEC is stabilized at the predetermined maximum value.

Figure 1:
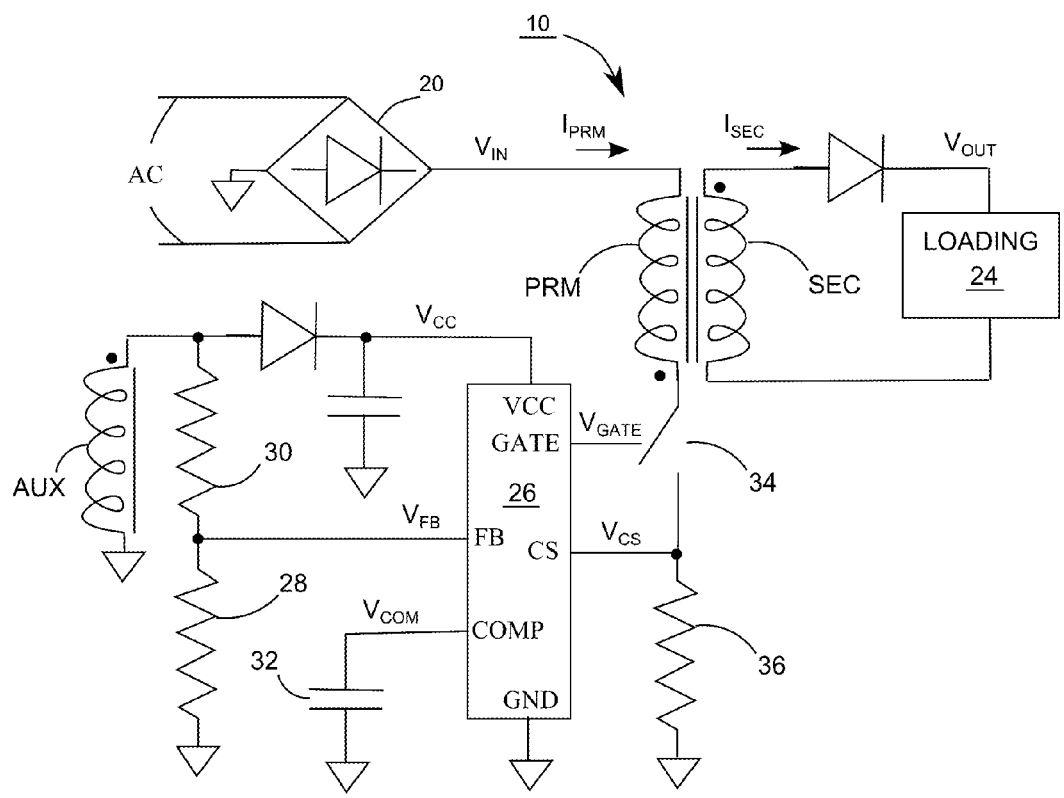
FIG. 1 is a switched mode power supply known in the art.
Figure 5:
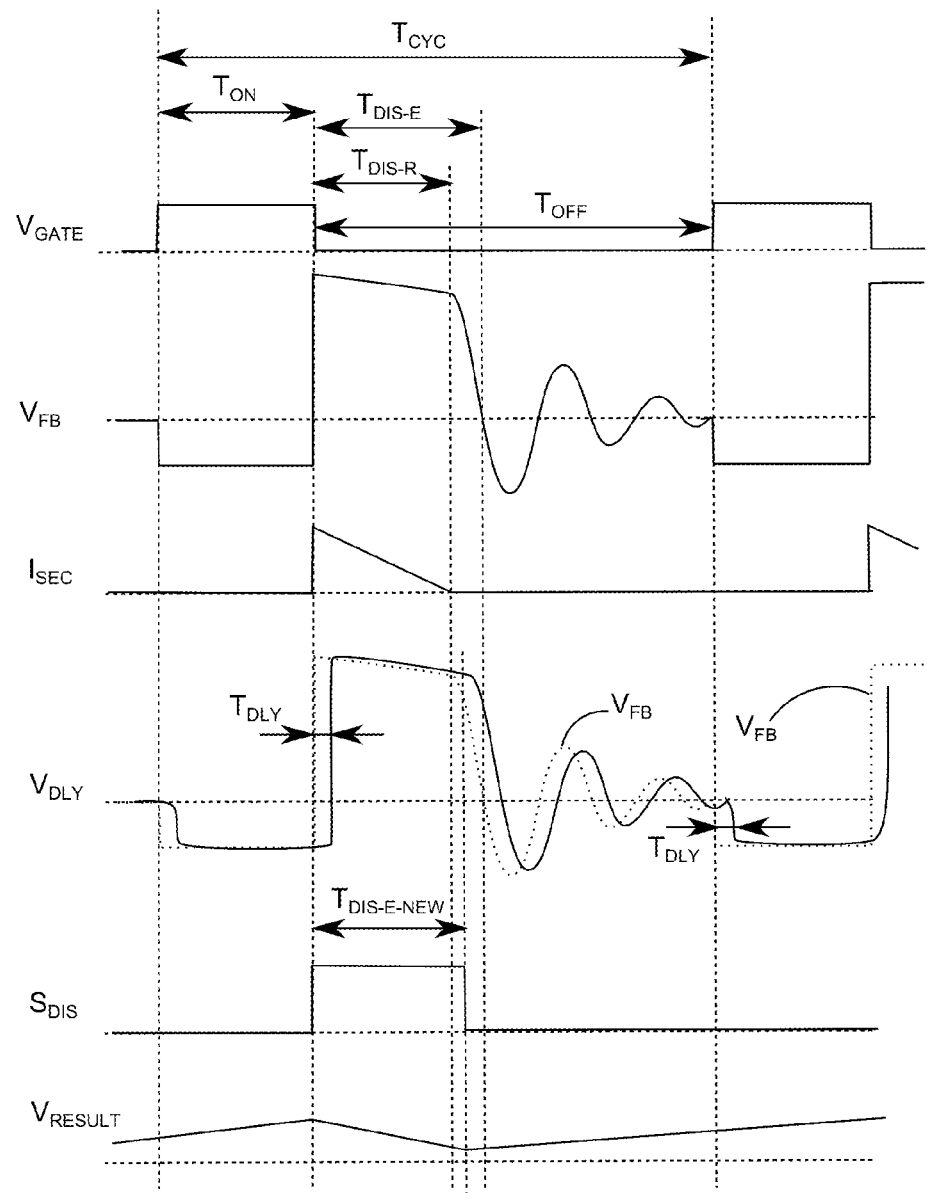
FIG. 5 shows some waveforms of the signals in FIG. 1 and FIG. 4.

FIG. 5 shows some waveforms of the signals in FIG. 1 and FIG. 4. In addition to the gate signal $V_{GATE}$, the feedback voltage signal $V_{FB}$, and the secondary output current $I_{SEC}$ shown in FIG. 2, FIG. 5 further has the delayed signal $V_{DLY}$ the discharge signal $S_{DIS}$, and the integral result voltage $V_{RESULT}$. Neighboring to the delayed signal $V_{DLY}$ the feedback voltage signal $V_{FB}$ is illustrated once again in a dashed waveform for comparison. The delayed signal $V_{DLY}$ and the feedback voltage signal $V_{FB}$ substantially share the same waveform, but the former is about delay time $T_{DLY}$ later than the later. As shown in FIG. 5, the rising and falling edges of the delayed signal $V_{DLY}$ all occur later than corresponding edges of the feedback voltage signal $V_{FB}$ by about delay time $T_{DLY}$, which is in proportion to the RC time constant defined by the low-pass filter 64. At the moment when the gate signal $V_{GATE}$ turns OFF the power switch 34, OFF time $T_{OFF}$ begins and the discharge signal $S_{DIS}$ switches to be "1" in logic, indicating the beginning of the discharge time $T_{DIS-E-NEW}$. As shown in FIG. 5, the feedback voltage signal $V_{FB}$ drops abruptly after the completion of the discharge of the secondary winding SEC. Meanwhile, because of the delay time $T_{DLY}$ provided by the low-pass filter 64, the delayed signal $V_{DLY}$ remains at a high voltage for a while. As the feedback voltage signal $V_{FB}$ falls and the delayed signal $V_{DLY}$ remains, the difference between them, if larger than a predetermined amount, can trigger the discharge signal $S_{DIS}$ to be "0", proclaiming the end of discharge time $T_{DIS-E-NEW}$.

During the discharge time $T_{DIS-E-NEW}$, integral result voltage $V_{RESULT}$ could decline because sink current $I_{DN}$ is larger than the constant current $I_{UP}$. Otherwise, the integral result voltage $V_{RESULT}$ always ramps up because the constant current $I_{UP}$ constantly charges the capacitor 80. If the integral result voltage $V_{RESULT}$ becomes less at the end of a cycle time $T_{CYC}$ than it was at the beginning of the cycle time $T_{CYC}$, it could be determined that the average output current from the secondary winding SEC exceeds a predetermined maximum value. If the average output current form the secondary winding SEC is determined to be too much, for example, decision maker 76 could lower compensation voltage $V_{COM}$ to decrease the output power the switched mode power supply provides, such that the average output current is pulled back.

Figure 2:
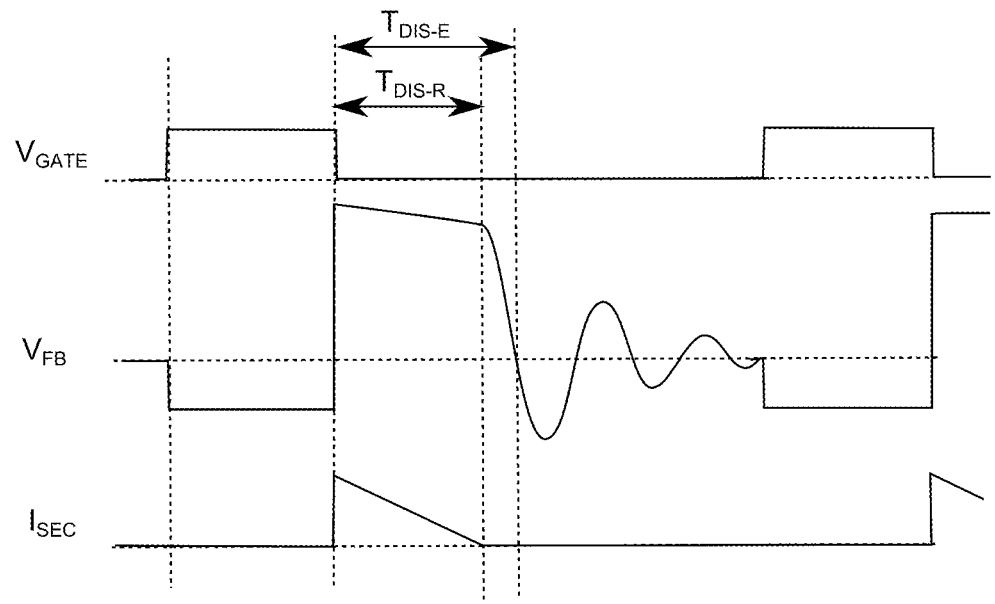
FIG. 2 shows gate voltage $V_{GATE}$, feedback voltage signal $V_{FB}$, and a secondary output current $I_{SEC}$ of FIG. 1.

FIG. 5 also illustrates the estimated discharge time $T_{DIS-E}$ of FIG. 2, which is obtained by the judgment when the feedback voltage drops across 0V as known in the prior art. Shown in FIG. 5, the discharge time $T_{DIS-E-NEW}$ is determined earlier than the estimated discharge time $T_{DIS-E}$, and is closer to the real discharge time $T_{DIS-R}$. Accordingly, the discharge time $T_{DIS-E-NEW}$ could achieve maximum output current control more accurately than the estimated discharge time $T_{DIS-E}$ does.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A constant current control unit, for a switched mode power supply with primary side control, wherein the switched mode power supply has a power switch and an inductive device, the constant current control unit comprising:
   a voltage-waveform detector, comprising a comparator with two inputs receiving a feedback voltage signal and a delayed signal respectively to determine a discharge time of the inductive device when the power switch is OFF by comparing the feedback voltage signal with the delayed signal, wherein the feedback voltage signal is provided from a reflective voltage of the inductive device and the delayed signal is generated by delaying the feedback voltage signal; and
   a constant current controller for generating an integral result according to the discharge time and a current-sense signal, wherein the current-sense signal is provided based on a current flowing through the inductive device;
   wherein the integral result is used for controlling the power switch to stabilize a maximum average output current of the switched mode power supply; and
   wherein the voltage-waveform detector comprises a low-pass filter, for low passing the feedback voltage signal to generate the delayed signal, and the low-pass filter is connected between the two inputs.

2. The constant current control unit as claimed in claim 1, wherein the
   low-pass filter comprises a resistor and a capacitor, for generating the delayed signal according to the feedback voltage signal.

3. The constant current control unit as claimed in claim 1, wherein the constant current controller comprises:
   an integrator, comprising:
      a controllable current source, for draining a sink current according to the current-sense signal; and
      a capacitor, for storing the integral result of the sink current with respect to the discharge time.

4. The constant current control unit as claimed in claim 3, wherein the integrator further comprises:
   a first constant current source for constantly providing a charge current to constantly charge the capacitor.

5. The constant current control unit as claimed in claim 3, wherein, if an integral result voltage on the capacitor goes beyond a certain range, a feedback control is provided to pull the integral result voltage back.

6. The constant current control unit as claimed in claim 5, wherein the integral result voltage is generated by charging the capacitor constantly and discharging the capacitor for the discharge time.

7. The constant current control unit as claimed in claim 1, wherein the constant current controller has a peak finder for finding a peak voltage of the current-sense signal.

8. The constant current control unit as claimed in claim 1, wherein the switched mode power supply has a transformer with a primary winding, an auxiliary winding and a secondary winding, and the feedback voltage signal is generated by detecting the voltage drop over the auxiliary winding.

9. A control method for a switched mode power supply with primary side control, wherein the switched mode power supply comprises a power switch and an inductive device, the control method comprising:
   detecting a reflective voltage of the inductive device to generate a feedback voltage signal;
   delaying the feedback voltage signal to generate a delayed signal;
   determining, according to the feedback voltage and the delayed signal, a discharge time of the inductive device when the power switch is OFF; and
   stabilizing a maximum average output current of the switched mode power supply according to the discharge time and a current-sense signal;
   wherein the current-sense signal represents a current flowing through the inductive device;
   wherein the step of delaying the feedback voltage signal comprises using a low-pass filter for low-passing the feedback voltage signal to generate the delayed signal;
   wherein the step of determining the discharge time comprises using a comparator with two inputs to compare the feedback voltage signal and the delayed signal and to determine an end of the discharge time;
   wherein the low-pass filter is connected between the two inputs.

10. The control method as claimed in claim 9, wherein the beginning of the discharge time is determined by the time when the power switch is OFF.

11. The control method as claimed in claim 9, wherein the step of stabilizing the maximum average output current comprises:
   finding a peak voltage of the current-sense signal; and
   providing a sink current according to the peak voltage to discharge a capacitor during the discharge time.

12. The control method as claimed in claim 11, wherein the step of stabilizing the maximum average output current comprises:
   stabilizing the maximum average output current according to a voltage on the capacitor.

13. The control method as claimed in claim 12, wherein the step of stabilizing further comprises:
   constantly charging the capacitor using a constant current source.

14. The control method as claimed in claim 9, wherein the switched mode power supply has a transformer with a primary winding, an auxiliary winding and a secondary winding, and the feedback voltage signal is generated by detecting the voltage drop over the auxiliary winding.

15. The control method as claimed in claim 9, wherein the step of low-passing the feedback voltage signal employs a low-pass filter comprising a resistor and a capacitor.

16. The control method as claimed in claim 9, further comprising:
   generating an integral result voltage on a capacitor in response to the discharge time and the current sense signal; and
   if an integral result voltage on the capacitor goes beyond a certain range, providing a feedback control to pull the integral result voltage back.

17. The control method as claimed in claim 16, wherein the integral result voltage is generated by charging the capacitor constantly and discharging the capacitor for the discharge time.

* * * * *